Riggs & Markham,
Milk Cooler.

Nº 85,330. Patented Dec. 29, 1868.

Witnesses:
George M. Weaver
John G. Cucher

Inventors:
Homer C. Markham
Charles G. Riggs

UNITED STATES PATENT OFFICE.

CHARLES G. RIGGS, OF TURIN, AND HOMER C. MARKHAM, OF WEST TURIN, NEW YORK.

IMPROVEMENT IN MILK-COOLERS.

Specification forming part of Letters Patent No. 85,330, dated December 29, 1868.

*To all whom it may concern:*

Be it known that we, CHARLES G. RIGGS, of Turin, and HOMER C. MARKHAM, of West Turin, Lewis county, and State of New York, have invented a new and useful Deodorizing Milk-Cooler.

The nature of our said invention consists in passing the milk, in a thin stratum, slowly over a cooling-surface, which allows it to be fully exposed to the air, by means of which it is thoroughly and speedily cooled, and the impure odors which affect the milk and cheese, if retained, are freely carried off.

And we do hereby declare that the following is a full, clear, and exact description of our said invention, and of the mode of operation of the same, reference being had to the annexed drawings, making a part of this specification, in which—

Figure 1:
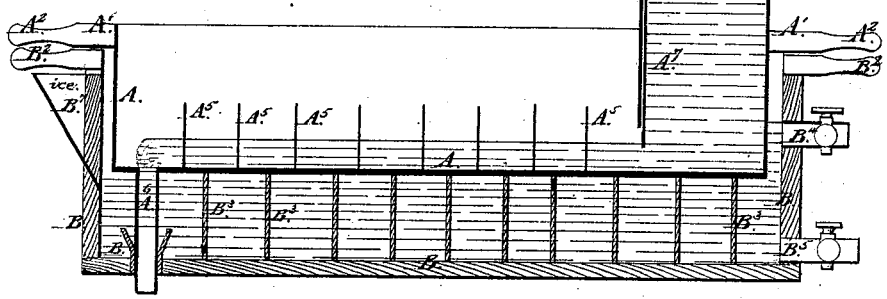
Figure 2:
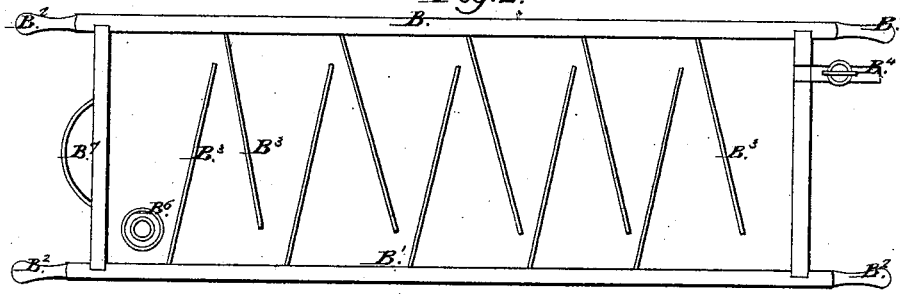
Figure 3:
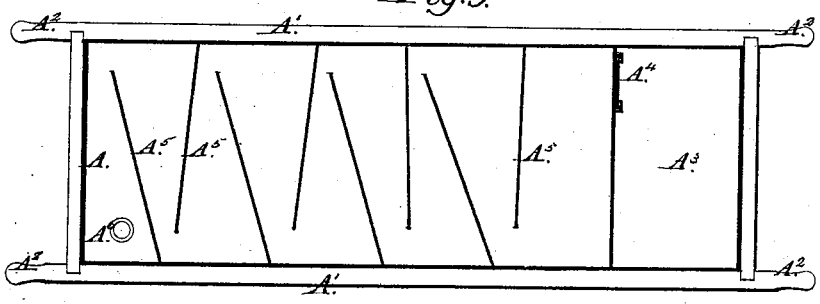

Figure 1 represents a sectional view thereof; Fig. 2, a plan of the lower or water vat, and Fig. 3 a plan of the upper or milk vat.

A is the milk-vat; $A^1 A^1$, the frame; $A^2 A^2$, the handles; $A^3$, the milk can or tank; $A^4$, a gate therein; $A^5 A^5$, guides; $A^6$, spout for carrying off the cooled milk; B and $B^1$, frame of water-vat; $B^2 B^2$, the handles; $B^3 B^3$, guides; $B^4$, upper cock; $B^5$, lower cock; $B^6$, funnel for passing spout $A^6$ through; $B^7$, spout for conducting water to vat.

It will be seen that two vats are used—one below, through which cool water is passed, and the other set in it, over the bottom of which the milk is passed. To give time for producing the best effect in cooling and freeing the milk from impure odors, the cold water and milk are both caused to pass from end to end of their respective vats, in a zigzag direction, by means of the guides $A^5 A^5$ and $B^3 B^3$, respectively.

The lower vat, B, may be of wood, with guides $B^3 B^3$, as seen in Fig. 2, which serve as a support to the upper vat, as well as to guide the course of the water, as seen in Fig. 1.

At the front end is a spout, $B^7$, for passing in the cold water, which spout may contain ice, when necessary to cool the water. At the opposite end is the cock $B^4$, which is open while the cooler is in operation, and which consequently keeps the water in the vat at a given level. The lower cock, $B^5$, serves to drain the vat when desired. Near the front end is the funnel $B^6$, for passing the milk-spout $A^6$ through. This funnel may have on its inside a ring of india-rubber, so as to fit tightly on $A^6$, and prevent the escape of water.

The upper or milk vat may be of tin or other suitable sheet metal. It may be of about half the depth of B, and a little less in length and width, so that the water in B may flow freely around its sides. It may have a tank at one end, as $A^3$, for receiving and passing the milk, or this may be done directly from the ordinary milk-can through the cock. If a vat is used, a gate, $A^4$, is placed at the bottom to regulate the flow of the milk. The bottom is crossed by guides, as in the vat B, (see Fig. 3,) and at the front end is a spout, $A^6$, for carrying away the milk to the cheese-vat or other receptacle, which passes through the funnel $B^6$, as seen in the drawing.

The operation is as follows: Cold water enters the lower vat through the spout $B^7$, and rises up to a level with the cock $B^4$, when the surplus passes off through it; hence the water is constantly flowing through the vat. The vat A being in place, and the tank $A^3$ being filled with milk, the gate $A^4$ is raised, and the milk passes slowly down to the spout $A^6$, directed by the guides $A^5 A^5$.

The spout $A^6$ may be placed over a cheese-vat, or the milk may by pipes be conveyed to several cheese-vats or other receptacles, as desired.

By passing the milk slowly, in the manner described, in a thin stratum, all parts of it are exposed to the air, and the bad odors are carried off, as well as the heat; and by passing the water through the lower vat, a cool surface is always presented to the bottom and sides of the flowing milk.

By passing the water and milk in opposite directions, the milk is more gradually and evenly cooled than if the cold water entered at the same end with the milk; but, of course, that mode may be adopted, if preferred, and instead of passing the milk zigzag, in the manner mentioned, it may be made to flow over the bottom in a thin stratum without the guides; but the method described is preferred.

We do not broadly claim cooling milk by running a current of water in contact with a vessel containing a current of milk running in a direction opposite to the water-current; but

What we claim as our invention, and desire to secure by Letters Patent, is—

The combination of the vats A and B, constructed and operating substantially as described.

CHARLES G. RIGGS.
HOMER C. MARKHAM.

Witnesses:
F. McCULLOCK,
JOHN DEVOE.